United States Patent

Mealey et al.

[11] Patent Number: 5,963,737
[45] Date of Patent: *Oct. 5, 1999

[54] INTERUPT VECTORING FOR TRACE EXCEPTION FACILITY IN COMPUTER SYSTEMS

[75] Inventors: Bruce Gerard Mealey; James William Van Fleet; Michael Stephen Williams, all of Austin, Tex.

[73] Assignee: International Business Machines Corporation, Armonk, N.Y.

[*] Notice: This patent is subject to a terminal disclaimer.

[21] Appl. No.: 08/634,467

[22] Filed: Apr. 18, 1996

[51] Int. Cl.⁶ .................................................. G06F 9/00
[52] U.S. Cl. ........................... 395/591; 395/568; 395/733
[58] Field of Search ..................... 395/568, 580, 395/590, 591, 733, 677, 183.1, 183.11

[56] References Cited

U.S. PATENT DOCUMENTS

| | | | |
|---|---|---|---|
| 5,003,466 | 3/1991 | Schan, Jr. et al. | 395/183.17 |
| 5,095,526 | 3/1992 | Baum | 395/740 |
| 5,109,329 | 4/1992 | Strelioff | 395/734 |
| 5,187,791 | 2/1993 | Baum | 395/741 |
| 5,197,138 | 3/1993 | Hobbs et al. | 395/563 |
| 5,404,493 | 4/1995 | Bolme et al. | 395/500 |
| 5,410,709 | 4/1995 | Yu | 395/725 |
| 5,446,876 | 8/1995 | Levine et al. | 395/184.01 |
| 5,463,764 | 10/1995 | Mueller | 395/182.13 |
| 5,485,579 | 1/1996 | Hitz et al. | 395/200.51 |
| 5,535,416 | 7/1996 | Feeney et al. | 395/834 |
| 5,598,562 | 1/1997 | Cutler et al. | 395/674 |
| 5,628,016 | 5/1997 | Kukol | 395/704 |
| 5,694,606 | 12/1997 | Fletcher et al. | 395/734 |
| 5,758,168 | 5/1998 | Mealey et al. | 395/733 |

*Primary Examiner*—Richard L. Ellis
*Assistant Examiner*—John Follansbee
*Attorney, Agent, or Firm*—Richard A. Henkler; John G. Graham; Andrew J. Dillon

[57] ABSTRACT

An exception handler for a computer system, particularly for performance monitoring facilities, employs implementation-dependent steps executed from a kernel extension which is more application level than kernel level. The implementation-independent kernel is involved only at very minimum level for a prologue to the exception handling routine. First a kernel extension registers an exception with the processor by storing the address of a pointer to a first-level interrupt handler; this address is stored in a location in kernel data storage, in non-paged memory. When an exception condition is reached, state is saved and the address location is checked to see if an exception has been registered. If so, the address is used to go to the first-level interrupt handler, which is at the kernel extension level. The first-level interrupt handler may access a second-level interrupt handler. Only the code which is used to save state and check to see if an exception is registered is in the kernel, and this part of the exception handling code is implementation-independent. i.e., the same for all implementations of this processor architecture.

9 Claims, 4 Drawing Sheets

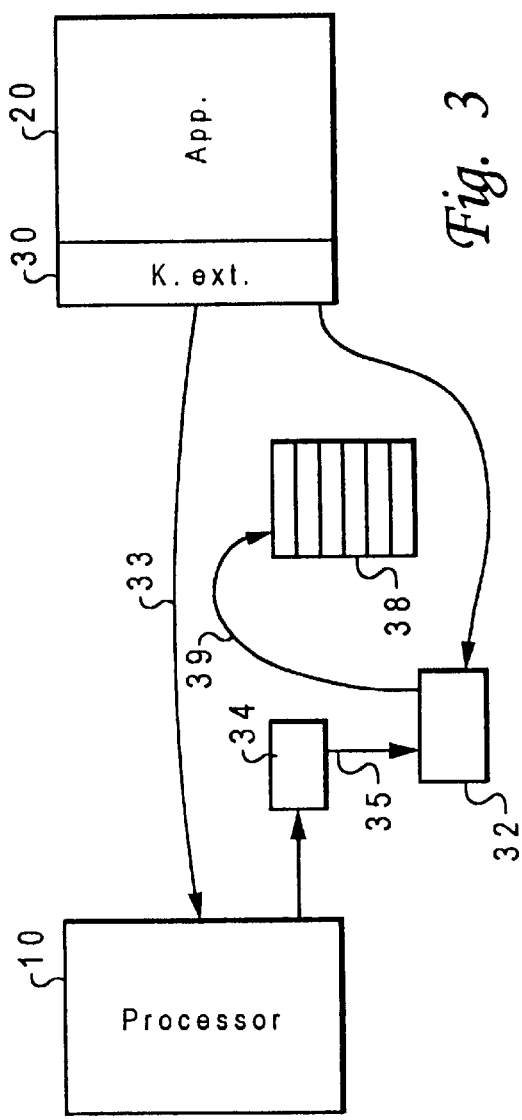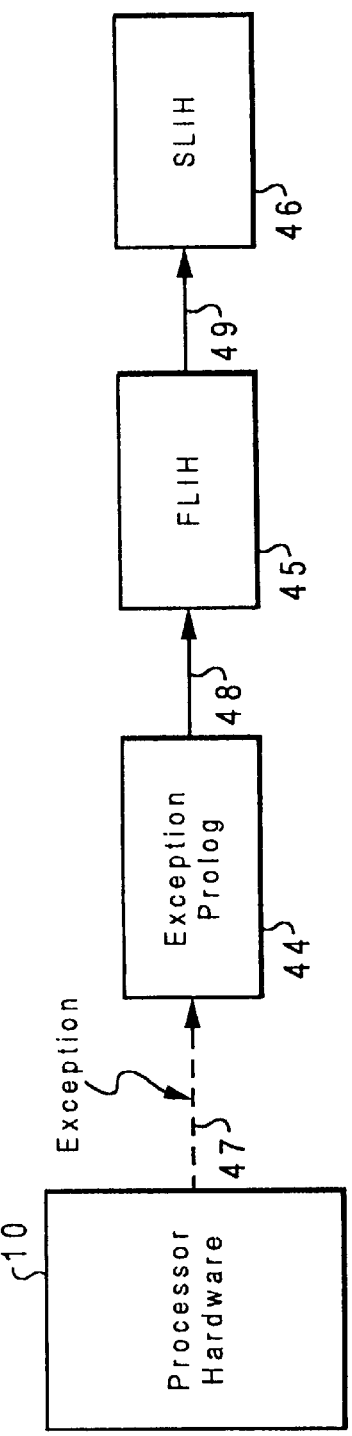

INTERUPT VECTORING FOR TRACE EXCEPTION FACILITY IN COMPUTER SYSTEMS

RELATED APPLICATIONS

The subject matter of this application is related to that disclosed in the following applications, filed herewith and assigned to the assignee of this application:

Ser. No. 08/634,712, INTERRUPT VECTORING FOR INSTRUCTION ADDRESS BREAKPOINT FACILITY IN COMPUTER SYSTEMS, by Bruce G. Mealey, James W. Van Fleet, and Michael S. Williams now U.S. Pat. No. 5,790,846.

Ser. No. 08/634,468, INTERRUPT VECTORING FOR OPTIONALLY ARCHITECTED FACILITIES IN COMPUTER SYSTEMS, by Bruce G. Mealey, James W. Van Fleet, and Michael S. Williams now U.S. Pat. No. 5,758,168.

BACKGROUND OF THE INVENTION

1. Technical Field:

The present invention relates to exception handling for data processing systems and more particularly relates to improvements in handling exceptions for performance monitoring or the like in data processing systems.

2. Description of the Related Art:

The PowerPC™ architecture is a high-performance reduced instruction set (RISC) processor which has been produced in various implementations, including the PowerPC 604™ which is described in "PowerPC 604™ RISC Microprocessor User's Manual" published in 1994 by IBM Microelectronics and Motorola, incorporated herein by reference.

The PowerPC™ "architecture" is a definition of the instruction set, registers, addressing modes, and the like, for this specific computer system, as described in detail in "The PowerPC™ Architecture: A Specification for a New Family of RISC Processors." The architecture is somewhat independent of the particular construction of the microprocessor chips or chips used to implement an instance of the architecture. For example, the PowerPC™ computer architecture has been constructed in various implementations as the PowerPC 601™, 602™, 603™, and 604™. These implementations have been described in detail in published manuals.

The PowerPC (as well as other processor architectures) defines certain functions which are useful for performance and analysis tools. The definition of these functions may be at the exception level. For example, exceptions may be defined for performance monitor, trace, and instruction address breakpoint. These functions employ special purpose on-chip registers which are an optional part of the architecture definition, and may be present in some implementations (e.g., the 604) but not in others. Exceptions must of course be fielded by the kernel; however, the analysis tools for functions such as performance monitor, trace, and instruction address breakpoint are actually more application-level than kernel-level. That is to say, the functions are specialized for specific types of analysis which does not necessarily relate to the generalized requirements of the kernel. Additionally, some of the functions are architected to be implementation-dependent. That is, one version of the architecture may have different implementations of similar functions, or, the function may not be present on each application.

The type of architecture just described, i.e., optional, kernel-level, and implementation-dependent functions, presents a support problem for the kernel, because the functions are optional and implementation-dependent. Since the support is not general and is chip-dependent, a large number of special-purpose modules would have to be added to the kernel to accommodate all of the possibilities for executing the functions with various platforms.

SUMMARY OF THE INVENTION

It is an object of the invention to provide improved exception handling arrangement for data processing systems.

Another object is to provide an interrupt handler or exception handler for a processor system which has facilities which may be present in one implementation of a processor architecture but not in others.

A further object is to provide an implementation-dependent interrupt handler mechanism for a processor system which does not require major addition to an implementation-independent kernel used as the operating system for the processor.

The above as well as additional objects, features, and advantages of the present invention will become apparent in the following detailed written description.

According to one embodiment of the invention, an exception handler for a computer system, particularly for performance monitoring facilities, employs implementation-dependent steps executed from a kernel extension which is more application-level than kernel level. The implementation-independent kernel is involved only at very minimum level for a prologue to the exception handling routine. First a kernel extension registers an exception handler with the processor by storing the address of a pointer to a first-level interrupt handler; this address is stored in a location in kernel data storage, in non-paged memory. When an exception condition is reached, state is saved and the address location is checked to see if an exception has been registered. If so, the address is used to go to the first-level interrupt handler, which is at the kernel extension level. The first-level interrupt handler may access a second-level interrupt handler. Only the code which is used to save state and check to see if an exception is registered is in the kernel, and this part of the exception handling code is implementation-independent. i.e., the same for all implementations of this processor architecture.

DESCRIPTION OF THE FIGURES

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a diagram of data structures and control flow for executing exceptions according to the system of FIG. 1;

FIG. 5 is a diagrammatic representation for an exception handler according to the prior art;

DESCRIPTION OF ILLUSTRATIVE EMBODIMENT

Figure 1:
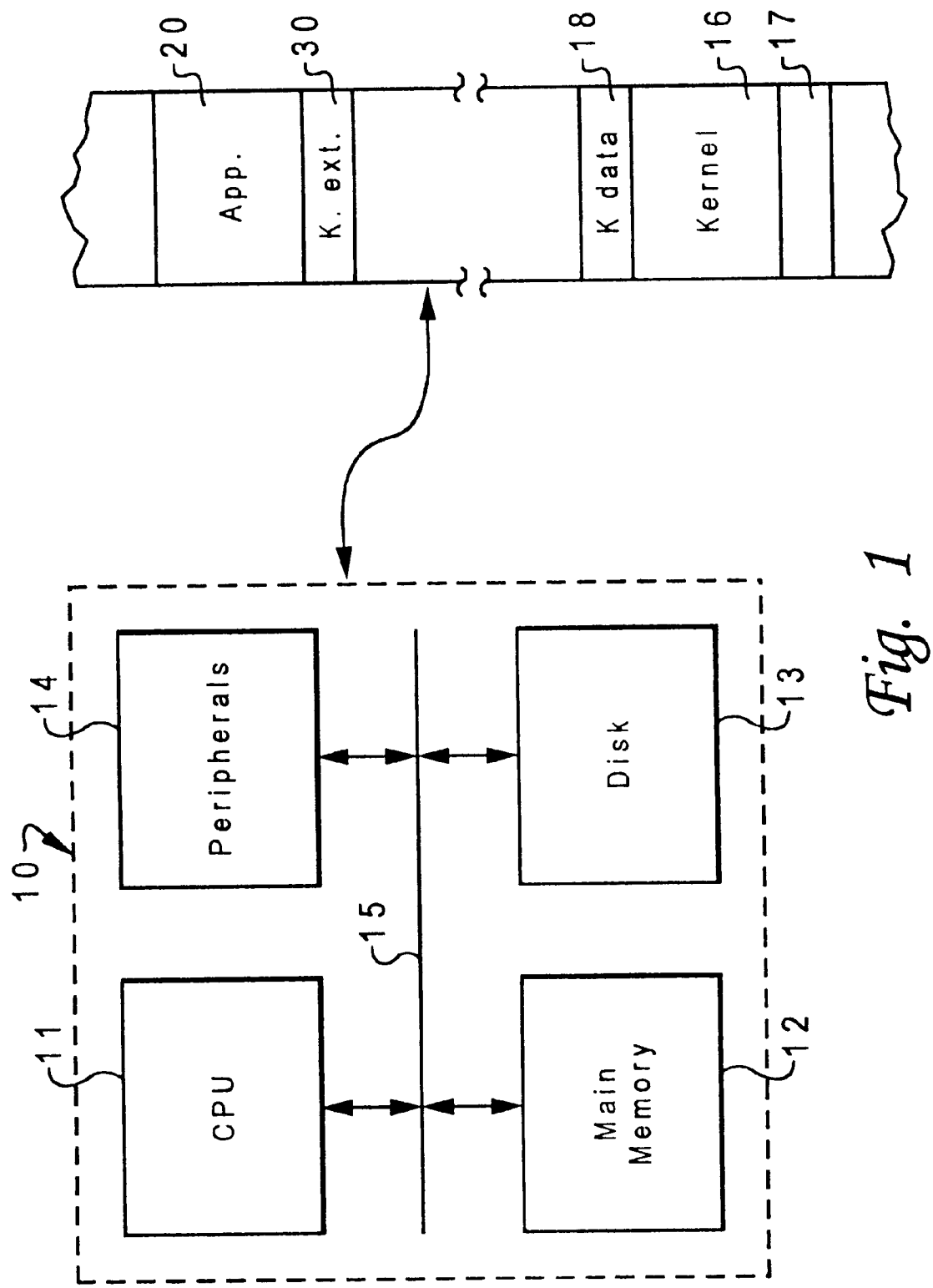
FIG. 1 is a functional block diagram of a processor system and associated memory map for exception handlers according to an embodiment of the invention.

Referring to FIG. 1, a computer system 10 is shown in which a CPU 11 has a certain hardware configuration including, for example, main memory 12, disk storage 13, and peripherals 14, interconnected by a system bus 15. The computer system may be of any type, such as that employing one or more PowerPC microprocessor chips in the CPU, or various other microprocessor types. The operating system used in this example has a kernel 16 which is implementation independent, i.e., can be used for all different implementations of the architecture defined by the microprocessor and supported by the kernel. Some machine dependent code 17 is needed to adapt the kernel 16 to the particular hardware configuration, but this is transparent to the applications programs running on the system, which only see the kernel itself. The kernel has associated with it certain data storage 18 located in low memory which is used by the kernel, though the kernel 16 itself is only instruction code. The kernel 16, machine-dependent code 17 and kernel data 18 are all in pinned memory, i.e., memory locations that are always resident in main memory 12, and are never paged out to disk storage 13. The kernel can thus use real addresses in accessing its own code and data, and there will never be a page fault. Various applications 20 run on the system 10, supported by the operating system or kernel 16, and these are in virtual memory area that subsist in main memory 12 only when actually being used, otherwise being in disk storage 13.

Figure 2:
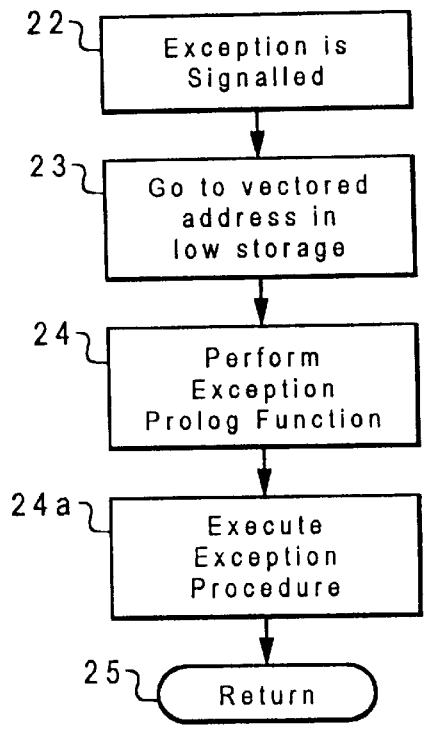
FIG. 2 is a flow chart for an exception handler according to the prior art.

Exceptions are usually handled by a computer system in a manner illustrated in FIG. 2, where code that is resident in the kernel for responding to exceptions is shown in a flow chart form. The CPU recognizes that an exception has been signalled at block 22, and this consists of an interrupt of various defined types, or a page fault, or a cache miss, etc. The exception is vectored, based on the exception type, to a selected location in low memory, so in block 23 control passes to the vectored location, where the exception code area for that exception is found. The initial exception code, or exception prolog function, in block 24 is generally saving one or two registers and a transfer to a more extensive exception handler 24a. In block 24a, control has transferred to the exception procedure and the detailed steps of the exception are executed, such as swapping pages or whatever this particular exception requires. The exception ends in a return 25. All of the code for the exception of FIG. 2 resides in the kernel 16, and exception code must be written for each architecturally defined exception. Usually no provision is made for implementation dependent exceptions, i.e., the same kernel exception handlers are used for all implementations.

Figure 4:
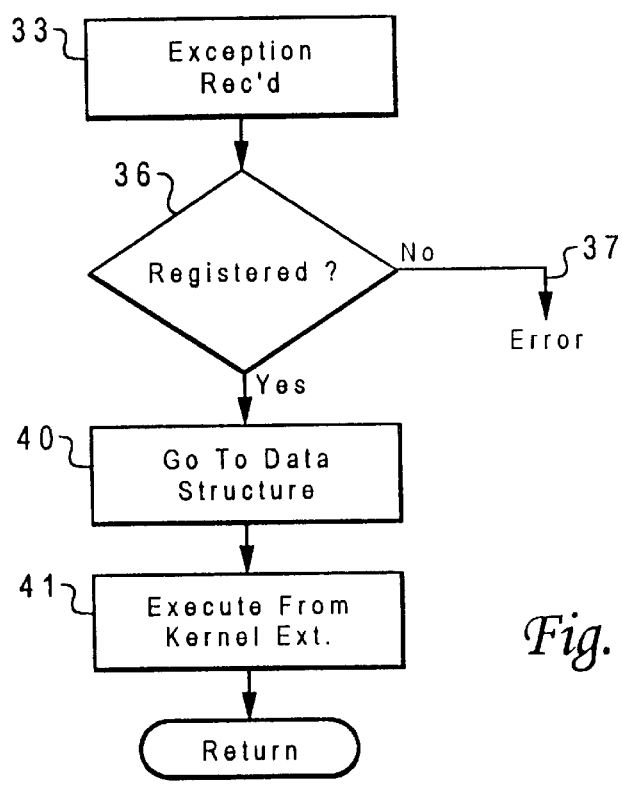
FIG. 4 is a flow chart for the exception handler of FIGS. 1–3.

According to the invention, a method of handling exceptions is employed which may be tailored to a particular application 20 uses a "kernel extension" 30. The kernel extension is more akin to application software than it is to the kernel, in that it resides in paged memory, but is pinned, and it is or can be machine specific. Referring to FIG. 3, and to the flow diagram of FIG. 4, the kernel extension 30 first registers an exception procedure with the kernel 16 indicated by path 31. This consists of writing an address to a location 32 in kernel memory 17, and the step does not involve the kernel directly, i.e., no code in the kernel is executed to perform this step. The registration step must be done before an exception is signalled by the application 20. At some later time, the application 20 signals an exception by appropriate controls, in the usual manner, indicated by the path 33. In response, the kernel executes code 34 which has the sole function of reading location 32 as indicated by path 35 to see if an address is stored there, and, if so, to get the address stored there by the registration; this step of the process is indicated by the decision block 36 of FIG. 4. If the address at the location 32 is zero, it means no registration has occurred, and the process defaults, indicated by path 37 in FIG. 4. If a non-zero address is found in location 32, the next step is to go to that address which is the location of a data structure 38, indicated by path 39 in FIG. 3 and block 40 in FIG. 4. The data structure 38 is created by the kernel extension 30 and contains the address in the kernel extension 30 to begin executing the exception procedure which is indicated by block 41.

The exception method as described above has particular utility in performance monitoring tools for microprocessor devices. In one embodiment, a PowerPC chip has certain performance monitoring hardware built in, such as breakpoint detectors, instruction counters, branch prediction miss counters, cache miss counters, etc. Some implementations of computer systems employing a PowerPC chip use these performance monitoring facilities and some do not. Also, the way in which they are used may be different for various external hardware configurations. Therefore, the exceptions needed to make use of performance monitoring should not be part of the kernel.

Referring to FIG. 5, the usual method of implementing exceptions (interrupts) employs software elements resident in the kernel 16, including an exception prologue 44, a first-level interrupt handler (flih) 45, and perhaps a second-level interrupt handler (slih) 46. When an exception is signalled by the hardware, and is not being masked, the CPU 11 goes by path 47 to the exception prologue, which is just a few instructions and serves merely to preserve minimal state and to get the address of and transfer control to the first-level interrupt handler 44. This prologue 44 is different for different implementations of the architecture, and so the kernel must have different code for each implementation. Control goes to the first-level interrupt handler via path 48 of FIG. 5, and here the functions performed are to save state and to either process the exception and return, or to transfer control to a second-level interrupt handler 46 via path 49. The first-level interrupt handler 45 operates in a very limited interrupt context environment, is masked for all asynchronous interrupts, uses low-level kernel services, and does not have a stack. The second-level interrupt handler 46 operates in a less-limited environment, as it may not be masked for all interrupts and gets a stack. In either event, i.e., whether only a first-level interrupt handler 45 is used for a given exception, or both first-level and second-level interrupt handlers 45 and 46 are used, these elements are a part of the kernel 16.

According to the invention, the first-level interrupt handler 45, or at least part of it, and the second-level interrupt handler 46, are not in the kernel, but instead are part of a kernel extension 30 and so can be tailored for a specific implementation of the architecture.

Figure 6:
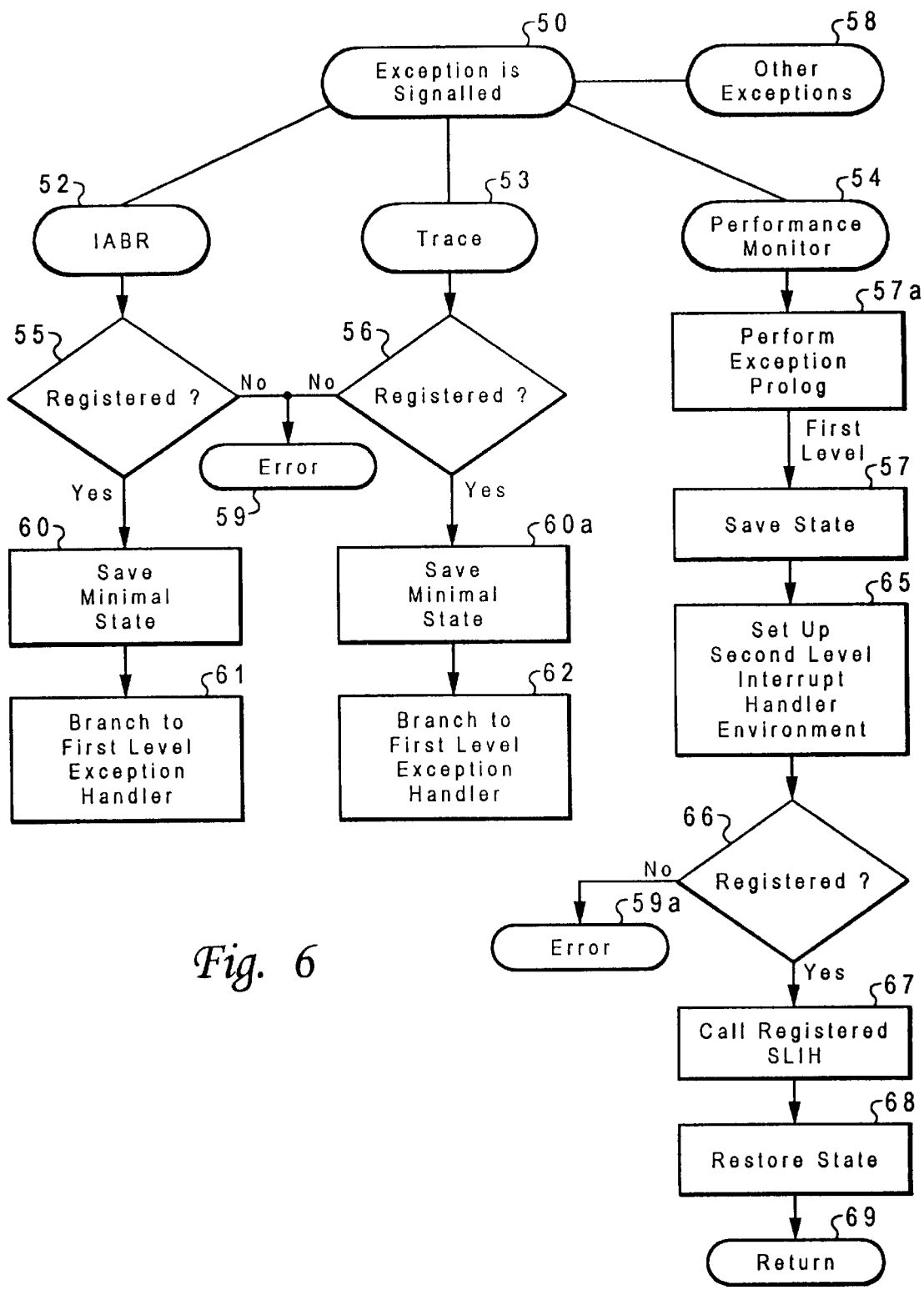
FIG. 6 is a more detailed flow chart for the exception handler of FIGS. 1–4.

Referring to FIG. 6, the exception handling method according to the invention is illustrated in flow chart form. An exception condition occurs as indicated by block 50. The type of exception is determined by the hardware at blocks 52, 53, 54, and 58. If the exception is an instruction address breakpoint exception, control goes to block 55 from block 52. If the exception is a trace exception, in which case control goes to block 56. If the exception is a performance monitor exception at block 54, and if so control goes to the block 57a, but if not then control goes to block 58 where the exception is implemented in conventional manner. In blocks 55 and 56, a test is made to determine if an exception handler has been registered for this exception, corresponding to elements 32 and 36 above. If an exception handler is not registered, the processor goes to an error condition indicated by the block 59. If an exception handler has been registered, i.e., an address is present in the location 32 of FIG. 1, then the processor saves state by storing certain registers at blocks 60 or 60a of FIG. 6. If the exception is an instruction address breakpoint exception, the next step is to branch to the first-level interrupt handler for the instruction address breakpoint function as indicated by the block 61 in FIG. 6. Otherwise, if the exception is a trace exception, the next step is to branch to the first-level interrupt handler for the trace function as indicated by the block 62 in FIG. 6. The first level interrupt handler in the kernel extension for either the instruction address breakpoint exception or the trace exception processes the exception as required. In these cases there is no return from the interrupt, but instead processing continues at the point of interrupt when the kernel extension first level interrupt handler has completed its processing and has restored state. If the exception is a performance monitor exception, the flow is different from the instruction address breakpoint and trace exceptions. After the exception prolog processes in block 57a and state is saved in block 57, the next step is to set up the environment for the second level interrupt handler, as indicated by the block 65. Next a check is made to see if the interrupt handler is registered, at block 66. If not, an error condition occurs; if so, then the kernel extension second-level interrupt handler is called at block 67. After the performance monitor exception handling is performed, control is returned by the kernel extension slih to block 68 where state is restored and a return to the interrupted program is executed at block 69.

It is noted that for the trace exception and the instruction address breakpoint exception, the elements after the block 51 are in the kernel extension 30 rather than in the kernel 16. For the performance monitor exception, more of the first-level interrupt handler is in the kernel.

The following describes in detail facilities used to enable information provided by the performance monitor and trace architecture for the PowerPC to be used by performance analysis tools. Kernel extensions 30, which cooperate with the problem program-level performance tools, i.e., application 20, will have access to these interfaces. There are no performance monitor and trace architecture dependencies in the kernel 16; this design moves those dependencies to the kernel extensions 30.

Three parts will be described for this example embodiment:

(a) The performance monitor first-level interrupt handler (PM_FLIH)

(b) The trace exception first-level interrupt handler (TE_FLIH)

(c) The instruction address breakpoint exception first-level interrupt handler (IAB_FLIH).

The kernel support in the first-level interrupt handlers differs between PM_FLIH and the other two exceptions because of the exception conditions: the PM_FLIH may utilize standard state saving and restoring mechanisms while the TE_FLIH and the IAB_FLIH may not.

In both techniques, the interrupt handlers transfer control to a kernel extension second level interrupt handler which has been previously registered with the kernel. The communication between the kernel extension and the interrupt handlers is via a pointer exported by the kernel. The pointer 32 is a double-word pointer on 64-bit implementations; it is initialized to zero during kernel 16 initialization (e.g., power-up). During kernel extension registration, it is updated with a pointer with the real address 32 of a pinned storage structure 38. The communication structure provides an anchor for ctrace, performance monitor, and for instruction address breakpoint functions and includes a per-processor save area for the TE_FLIH and the IAB_FLIH.

A detailed design of a first-level interrupt handler prologue will be given first. For the performance monitor exception described, the interrupt handler prologue will save a register (r15), load the address of the ppda (per-processor data area) for this CPU into the register, save another register (r), and branch to the first-level interrupt handler entry point. The performance monitor prologue is "the standard prologue" for the machine implementation.

For the other two exceptions described, the interrupt handler prologues will save a register (r15), load the address of the ppda for this CPU into the register, save another register (r3), and branch to the first-level interrupt handler entry point. These two prologues are not the standard prologue, but are tailored to the needs for the particular exception function and environment.

Performance Monitor First-Level Interrupt Handler (PM_FLIH) Detailed Design:

The performance monitor first-level interrupt handler saves status with state_save, calls begin_interrupt, determines the function pointer address for the PM_SLIH, saves the interrupt iar and the interrupt link register contents in the pm_data (the pm_data area is supplied by the kernel extension and found through the communications vector) for this CPU, and calls the PM_SLIH with the virtual address of the pm_data for this CPU and the cpuid as parameters. The interrupt data is placed in the pm_data in the appropriate mode. When the PM_SLIH has performed its functions, it returns to the PM_FLIH. The PM_FLIH returns to the interrupted program using finish_interrupt. The following is a listing of the performance monitor first-level interrupt handler in pseudocode form:

```
perfmon_flih:
    state_save_pc() /*save state*/
    begin_interrupt(0xf,-1)      /*begin interrupt at level 15, stay at
                *INTMAX*/
    if(!pmihrv) {
            assert(0);
    }
    pmihrv->pm_data[CPUID].iar = interrupt.SRR0 /* 64 or 32 bit
    pmihrv->pm_data[CPUID].lr = interrupt.LR /* 64 or 32 bit
                    /* call kernel extension pm slih (virtual addresses)*/
    pmihrv->pm_flih_ke(&pm_data[CPUID],CPUID);/*call registered
                                                    interrupt handler */
    finish_interrupt()
```

Trace Exception Interrupt Handler Detailed Design:

The TE_IH is "invoked" using an exception. What that means is that it cannot trace anywhere where SRR0, SRR1, and SPRG1 are not saved. This implementation restricts utilization of the trace interrupt—it is simply not possible to trace interrupt handlers except after SRR0, SRR1, and SPRG1 have been saved.

The TE_IH prologue saves a register in SPRG1 and one in the ppda. The prologue will branch to a PowerPC 32-bit or 64-bit interrupt handler. The TE_IH then determines if there is a registered first-level interrupt handler. If there is none, the TE_IH asserts. If there is one, the real address of the registered save area for this processor is extracted from the communications area. The saved registers are moved to the save area as 32- or 64-bit quantities, as appropriate. Additional state is also saved in the save area. The first-level interrupt handler is entered (in 32-bit mode), via branch-to-count register to the real address of the first-level interrupt handler, with the save area address as a parameter (in register 3). When the trace exception first-level interrupt handler has completed its work, it restores status and returns to the interrupted program via rfi (return from interrupt). The following is a listing for the trace exception interrupt handler in pseudocode form:

```
TE-IH:        /*flih prolog saves 15 and 0 -- 15 points to
                    ppda*/
    r3 = CR        /*save condition reg*/
    if(!pmihrv) { /*assert if interrupt without registration*/
        assert(0)
    }
    CR = r3
    r3 = &pmihrv.ke_savetrace[current_cpu]/*get address of save area*/
    r3 -> ke_r15 = SPRGI    /*move saved reg to save area*/
    r3 -> ke_r3 = ppda_trsv /*move saved reg to save area*/
    r3 -> ke_count = CTR    /*save count reg in save area*/
    r3 -> ke_cr = CR/*save cr reg in save area*/
    branch_count_reg(pmihrv_t.te_slih)/*branch absolute to flih*/
                    /*does not return*/
```

Instruction Address Breakpoint Exception Interrupt Handler Detailed Design:

The IAB_IH is "invoked" when the IABR is enabled and there is a compare between the contents of the IABR and the IAR. In this design and implementation, the compare address can be set wherever SRR0, SRR1, and SPRG1 can be altered without saving (that is, not in interrupt handlers, resume, etc.) and SPRG1 can be used as a temporary save area.

The IAB_IH functions fundamentally as does the TE_IH. The only difference is the address of the save area and the routine address. It saves a register in SPRG1 and one in the ppda. It then determines if there is a registered first-level interrupt handler. If there is none, the IAB_IH asserts. If there is one, the real address of the registered save area for this processor is extracted from the communications area. The saved registers and additional state are moved to the save area. The first-level interrupt handler is entered, via branch count register, to its real address, with the save area address as a parameter. When the IAB first-level interrupt handler has completed its work, it restores state and returns to the interrupted segment via rfi. The following is a listing of the instruction address breakpoint exception interrupt handler in pseudocode form:

```
iab_ih:
    r3 = CR       /*save condition reg*/
    if(!pmihrv) {  /*assert if interrupt without registration*/
        assert(0)
    }
    CR = r3
    r3 = &pmihrv.ke_saveiabr[current_cpu]/*get address of save area*/
    r3 -> kc_r15 = SPRGI   /*move saved reg to save area*/
    r3 -> ke_r3 = ppda_trsv /*move saved reg to save rea*/
    r3 -> ke_count = CTR    /*save count reg in save area*/
    r3 -> ke_er = CR /*save cr reg in save area*/
    branch_count_reg(pinihrv_t.iab_slih)/*branch count reg to slih*/
                    /*does not return*/
```

Kernel extensions 30 must register their kernel extension FLIHs and SLIHs and required save areas for them. The kernel extension registration routine places the real address of the communications structure in the communications pointer 32. The communications structure contains the (real) address of the IAB_FLIH, the (real) address of the TE_FLIH, the (virtual) address of the PM_SLIH (function descriptor), the (virtual) address of per-processor parameter areas for the PM_SLIH, and the real addresses of per-processor save areas for the IAB_FLIH and the TE_FLIH.

Performance Monitor Facility:

In the illustrative embodiment, which is a PowerPC 604™ microprocessor, a performance monitor facility is provided to monitor and count predefined events such as processor clocks, misses in either the instruction cache or the data cache, instructions dispatched to a particular execution unit, mispredicted branches, and other occurrences. The count of such events can be used to trigger the performance monitor exception.

The performance monitor can be used for the following:

(a) To increase system performance with efficient software, especially in a multiprocessing system. Memory hierarchy behavior must be monitored and studied in order to develop algorithms that schedule tasks (and perhaps partition them) and that structure and distribute data optimally.

(b) To improve processor architecture, the detailed behavior of the 604's structure must be known and understood in many software environments. Some environments may not easily be characterized by a benchmark or trace.

(c) To help system developers bring up and debug their systems.

The performance monitor uses the following special-purpose registers (SPRs) in the CPU 11:

(a) Performance monitor counters 1 and 2 (PMC1 and PMC2)— two 32-bit counters used to store the number of times a certain event has been detected.

(b) The monitor mode control register (MMCR0), which establishes the function of the counters.

(c) Sampled instruction address and sampled data address registers (SIA and SDA): Depending on how the performance monitor is configured, these registers point to the data or instruction that caused a threshold-related performance monitor interrupt.

The processor supports a performance monitor interrupt that is caused by a counter negative condition or by a time-base flipped bit counter defined in the MMCR0 register. As with other interrupts, the performance monitor interrupt follows the normal exception model with a defined exception vector offset (0x00F00). The priority of the performance monitor interrupt is below the external interrupt and above the decrementer interrupt.

The performance monitor is a software-accessible mechanism that provides detailed information concerning the dispatch, execution, completion, and memory access of instructions. A performance monitor interrupt (PMI) can be triggered by a negative counter (most significant bit set to one) condition. A PI may also occur when certain bits in the time-base register change from 0 to 1; this provides a way to generate interrupts based on a time reference.

Depending on the type of event that causes the PMI condition to be signaled, the performance monitor responds in one of two ways:

(a) When a threshold event causes a PMI to be signaled, the exact addresses of the instruction and data that caused the counter to become negative are saved in the sampled instruction address (SIA) register and the sampled data address (SDA) register, respectively.

(b) For all other programmable events that cause a PMI, the address of the last completed instruction during that cycle is saved in the SIA, which allows the user to determine the part of the code being executed when a PMI was signaled. Likewise, the effective address of an operand being used is saved in the SDA. Typically, the operands in the SDA and SIA are unrelated.

When the performance monitor interrupt is signaled, the hardware clears MMCR0[ENINT] and prevents the changing of the values in the SIA and SDA until ENINT is set by software.

The performance monitor incorporates five SPRs: MMCR0, PMC1, PMC2, SIA, and SDA. All of these supervisor-level registers are accessed through mtspr and mfspr instructions.

PMC1 and PMC2 are 32-bit counters that can be programmed to generate interrupt signals when they are negative. Counters are considered to be negative when the high-order bit (the sign bit) becomes set. However, an interrupt is not signaled unless both MMCR0 [INTCONTROL] and MMCR0[ENINT] are also set.

Note that the interrupts can be masked by clearing MSR [EE]; the interrupt signal condition may occur with MSR [EE] cleared, but the interrupt is not taken until the EE bit is set. Setting MMCR0[DISCOUNT] forces the counters to stop counting when a counter interrupt occurs.

The event that is to be monitored can be chosen by setting the appropriate bits in the MMCR0[19–31]. The number of occurrences of these selected events is counted from the time the MMCR0 was set either until a new value is introduced into the MMCR0 register or until a performance monitor interrupt is generated.

The two address registers, SIA and SDA, contain the addresses of the data or the instruction that caused a threshold-related performance monitor interrupt. The SIA contains the effective address of an instruction executing at or around the time that the processor signals the performance monitor interrupt condition. If the performance monitor interrupt was triggered by a threshold event, the SIA contains the exact instruction that caused the counter to become negative. The instruction whose effective address is put in the SIA is called the sampled instruction. The SDA contains the effective address of an operand of an instruction executing at or around the time that the processor signals the performance monitor interrupt condition. In this case, the SDA is not meant to have any connection with the value in the SIA. If the performance monitor interrupt was triggered by a threshold event, the SDA contains the effective address of the operand of the SIA. The values of the SIA and SDA registers depend on the type of event being monitored.

The monitor mode control register 0 (MMCR0) is an SPR whose bits are partitioned into bit fields that determine the events to be counted and recorded. The selection of allowable combinations of events causes the counters to operate concurrently. Control fields in the MMCR0 select the events to be counted, can enable a counter overflow to initiate a performance monitor interrupt, and specify the conditions under which counting is enabled. The MMCR0 can be written to or read only in supervisor mode. The MMCR0 includes controls, such as counter-enable control, counter-overflow-interrupt control, counter-event selection, and counter-freeze control.

While the invention has been particularly shown and described with reference to an illustrative embodiment, it will be understood by those skilled in the art that various changes in form and detail may be made therein without departing from the spirit and scope of the invention.

What is claimed is:

1. A trace exception handling mechanism in a processor system having an operating system with a kernel, the processor system executing an application via said kernel, comprising:

means in a kernel-extension to said application, for registering a trace exception interrupt handler by a kernel extension, said means including a stored pointer to said a trace exception interrupt handler, means for detecting a trace exception condition in said processor, means in said kernel for checking to see if a trace exception interrupt handler has been registered, and, if so, saving state and then branching to said trace exception interrupt handler in said kernel-extension using said pointer.

2. A trace exception handling mechanism according to claim 1 wherein said kernel extension is implementation-dependent.

3. A trace exception handling mechanism according to claim 1 wherein said kernel is implementation-independent.

4. A trace exception handling mechanism according to claim 1 wherein said storing of said pointer is in non-paged memory.

5. A method of implementing a trace exception for a processor system having an operating system with a kernel, and executing an application via said kernel comprising the steps of:

registering by a kernel-extension for said application a trace exception interrupt handler including storing by said kernel-extension a pointer to said a trace exception interrupt handler, detecting a trace exception condition in said processor, checking, by said kernel to see if said trace exception interrupt handler has been registered, if so, then branching to said trace exception interrupt handler in said kernel-extension using said pointer.

6. A method of implementing a trace exception according to claim 5 wherein said kernel extension is implementation-dependent and wherein said kernel is implementation-independent.

7. A method of implementing a trace exception according to claim 5 including the step of saving state if said trace exception interrupt handler is registered.

8. A method of implementing a trace exception according to claim 5 wherein said storing of said pointer is in non-paged memory.

9. A method of implementing a trace exception according to claim 5 wherein said registering is by a kernel extension.

* * * * *

UNITED STATES PATENT AND TRADEMARK OFFICE
CERTIFICATE OF CORRECTION

PATENT NO. : 5,963,737
DATED : October 05, 1999
INVENTOR(S) : Mealey et al.

It is certified that error appears in the above-indentified patent and that said Letters Patent is hereby corrected as shown below:

On the title page: Item [54] and Col. 1, line 2, please replace "INTERUPT" with --INTERRUPT--.

Col 10, Line 35, insert after "registering" a -- , -- and insert after "application" a -- , --.

Col. 10, Line 40, insert after "kernel" a -- , --.

Signed and Sealed this

Fifth Day of September, 2000

Attest:

Q. TODD DICKINSON

Attesting Officer

Director of Patents and Trademarks